(12) United States Patent
Kmiecik et al.

(10) Patent No.: US 8,351,704 B2
(45) Date of Patent: Jan. 8, 2013

(54) METHOD OF CAPTURING LINEAR FEATURES ALONG A REFERENCE-LINE ACROSS A SURFACE FOR USE IN A MAP DATABASE

(75) Inventors: Marcin Michal Kmiecik, Podchorazych (PL); Wojciech Tomasz Nowak, Sucharskiego (PL)

(73) Assignee: Tomtom Global Content B.V., Eindhoven (NL)

( * ) Notice: Subject to any disclaimer, the term of this patent is extended or adjusted under 35 U.S.C. 154(b) by 416 days.

(21) Appl. No.: 12/733,844

(22) PCT Filed: Oct. 2, 2007

(86) PCT No.: PCT/NL2007/050477
§ 371 (c)(1),
(2), (4) Date: Apr. 7, 2010

(87) PCT Pub. No.: WO2009/045096
PCT Pub. Date: Apr. 9, 2009

(65) Prior Publication Data
US 2010/0208937 A1    Aug. 19, 2010

(51) Int. Cl.
*G06K 9/46* (2006.01)
(52) U.S. Cl. .................................................. 382/190
(58) Field of Classification Search .................. None
See application file for complete search history.

(56) References Cited

U.S. PATENT DOCUMENTS

| 2004/0062418 A1 | 4/2004 | Ishijura et al. |
| 2005/0100220 A1* | 5/2005 | Keaton et al. ............... 382/191 |

OTHER PUBLICATIONS

Massimo Bertozzi and Alberto Broggi, "Real-Time Lane and Obstacle Detection on the Gold System", Sep. 19-20, 1996, Intelligent Vehicles Symposium, 1996, Proceedings of the 1996 IEEE, pp. 213-218.*

Chuang Tao, Rongxing Li, and Michael A. Chapman, "Automatic Reconstruction of Road Centerlines from Mobile Mapping Image Sequences", Jul. 1998, Photogrammetric Engineering & Remote Sensing, vol. 64, No. 7, pp. 709-716.*
International Preliminary Report on Patentability dated Apr. 7, 2010.
Written Opinion dated Apr. 7, 2010.
International Search Report, from PCT/NL2007/050477, mailed Jun. 25, 2008.

* cited by examiner

*Primary Examiner* — Andrew W Johns
*Assistant Examiner* — Siamak Harandi

(57) ABSTRACT

A method of producing linear features along a reference-line across a surface for use in a map database is disclosed. In at least one embodiment, the method includes generating, from reference-line data representative of coordinates of the reference-line in a geographic coordinate reference system and source images of the surface adjacent to the reference-line and associated position and orientation data in the geographic coordinate reference system, a reference-line referenced data set, wherein the reference-line referenced data set includes a plurality of sets of image data and associated data defining a reference-line' across a surface in the geographic coordinate reference system, the sets of image data including pixels wherein a set of image data corresponds to an orthorectified view representation of a line section of the surface in the geographic coordinate reference system, each set of image data includes a reference pixel being associated with a position on the reference-line, wherein each pixel represents a surface having a position at a distance from the position of the reference pixel along the line section, and wherein the line section perpendicularly crosses the reference-line at the position associated with the reference pixel; and, post processing the reference-line referenced data set to produce linear features along the reference-line and associated locations in the geographic coordinate reference system for use in a map database.

10 Claims, 8 Drawing Sheets

METHOD OF CAPTURING LINEAR FEATURES ALONG A REFERENCE-LINE ACROSS A SURFACE FOR USE IN A MAP DATABASE

FIELD OF THE INVENTION

The present invention relates to a method of producing linear features along a reference-line across a surface for use in a map database. The invention further relates to a method of generating a reference-line referenced data set and a method of post processing a reference-line referenced data set to produce linear features along a reference-line across a surface and associated locations in a coordinate system for use in a map database. Moreover, the invention relates to a reference-line referenced data set, a computer implemented system for producing or verifying linear features, a computer program product and a processor readable medium carrying said computer program product or reference-line referenced data set.

PRIOR ART

There is a need to collect a large number of linear road information e.g. lane dividers, road centrelines, road width etc. for digital map databases used in navigation systems and the like. The geo-position of the road information could be stored as absolute or relative position information. For example, the centreline could be stored with absolute geo-position information and the road width could be stored with relative position information, which is relative with respect to the absolute geo-position of the centreline. The road information could be obtained by interpreting high resolution aerial orthorectified images. An orthorectified image is a "scale corrected" image, depicting ground features as seen from above in their exact ground positions, in which distortion caused by camera and flight characteristics and relief displacement has been removed using photogrammetric techniques. An orthorectified image is a kind of aerial photograph that has been geometrically corrected ("orthorectified") such that the scale of the photograph is uniform, meaning that the photograph can be considered equivalent to a map. An orthorectified image can be used to measure true distances, because it is an accurate representation of the earth's surface, having been adjusted for topographic relief, lens distortion, and camera tilt. Orthorectified views differ from perspective view as an orthorectified view project at a right angle to a reference plane, whereas perspective views project from the surface onto the reference plane from a single fixed position. An orthorectified image can be obtained by any suitable map projection. The map projection can be a projection by surface, such as cylindrical, pseudocylindrical, hybrid, conical, pseudoconical or azimuthal. The projection can also be a projection by preservation of a metric property. The map projections have in common that they are orthogonal projections, which means that every pixel represents a point on the surface of the reference plane (ellipsoid that approximates the shape of the earth) seen along a line perpendicular to that surface. Thus, every pixel of an orthorectified image of the earth surface substantially corresponds to a view of the earth surface seen along a line perpendicular to the ellipsoid that approximates the shape of the earth. An orthorectified image comprises metadata enabling an algorithm to reference any pixel of the orthorectified image to a point in the geographic coordinate reference system. As the exact position on the ellipsoid that approximates the shape of the earth of each pixel is known, the position and size of ground features, e.g. horizontal road information, can be retrieved from an orthorectified image. Such high resolution orthorectified images should have a pixel size below 25 cm.

Nowadays, "vertical" road information, e.g. speed limits, directions signposts etc. for digital map databases used in navigation systems and the like, can be obtained by analysing and interpreting horizontal picture images and other data collected by a earth-bound mobile collection device. The term "vertical" indicates that an information plane of the road information is generally parallel to the gravity vector. Mobile mapping vehicles which are terrestrial based vehicles, such as a car or van, are used to collect mobile data for enhancement of digital map databases. Examples of enhancements are the location of traffic signs, route signs, traffic lights, street signs showing the name of the street etc.

The mobile mapping vehicles have a number of cameras, some of them stereographic and all of them are accurately geo-positioned as a result of the van having precision GPS and other position determination equipment onboard. While driving the road network, image sequences are being captured. These can be either video or still picture images.

The mobile mapping vehicles record more then one image in an image sequence of an object, e.g. a building or road surface, and for each image of an image sequence the geo-position in a geographic coordinate reference system is accurately determined together with the position and orientation data of the image sequence with respect to said geo-position. Image sequences with corresponding geo-position information will be referred to as geo-coded image sequences. As the images sequences obtained by a camera represent a visual perspective view of the 'horizontal" road information, image processing algorithms might provide a solution to extract the road information from the image sequences. The geo-positions of the cameras and laser scanners are accurately known by means of an onboard positioning system (e.g. a GPS receiver) and other additional position and orientation determination equipment (e.g. Inertial Navigation System—INS). The geo-coded image sequences are used to generate orthorectified images. Geo-coded means that a position, computed by the GPS and possibly INS, and possibly heading associated with the image is attached to the metadata of the image. An geo-coded orthorectified image comprises metadata to define the associated projected coordinate reference system to determine for each pixel the corresponding position in the geographic coordinate reference system. These orthorectified images are comparable to aerial orthorectified images but with improved resolution and absolute geo-position. A method of generating orthorectified images and associated metadata defining the position and orientation data of the orthorectified image is disclosed in unpublished patent application PCT/NL2006/050252. This method enables us to generate very accurate geo-coded orthorectified images from Mobile Mapping System data only. The geo-coded images have a pixel resolution of 8 cm (=relative position accuracy within the image) and the metadata defining the position and orientation of the image on the earth surface has an absolute geo-position accuracy of 1 meter.

In both the aerial images and image sequences, the horizontal road information is present. By means of complex image processing algorithms, the lane information can be detected and the corresponding position information can be determined. Furthermore, a human can mark the desired horizontal road information in the orthorectified images on a screen. Software then calculates from said marks the geo-positions in the geographic coordinate reference system of the horizontal road information. Marking linear road information of curved roads, e.g. the road sides are in a bend, is more time consuming then marking the road side along a straight road. To mark a straight line only two points have to be indicated whereas to mark a curve more points have to be indicated. The accuracy of the curve depends on the number of points on the curve selected. Therefore, the more curvy a road the more time is effort is needed to retrieve the horizontal road information from the images. Similarly, the more curvy a road the more complex algorithms are needed to retrieve the horizontal road information from orthorectified images. First, the curved road surface has to be identified in the geo-coded orthorectified image. Secondly, the road markings have to be found on the road surface in the image. Finally, the linear road markings along the road have to be digitized. As the position and orientation of the road are not know in a geo-coded orthorectified image, symmetrical filters such as morphology filters have to be used to detect the linear road markings automatically. These filters are more complex then filters for detecting vertical or horizontal lines/edges only.

Furthermore, there are millions of kilometers or roads in the world that in the near future will need to be ADAS (Advanced Driver Assistance Systems) compliant. ADAS applications such as Adaptive Cruise Control, Transmission Assistance, Lane/Road Departure Detection and Warning, Braking and Stability Control Assistance, needs highly accurate road information about the road to control the vehicle and or warn the driver of safety issues. The road information needs to be captured and stored in a map database. The digital map will provide knowledge of the road ahead of the moving vehicle. It will provide prediction capabilities of up-coming curve beyond the driver's line of sight, such as curve shape, curve direction and radius, and road characteristics such as road type (high way, highway ramp, local road, etc.), number of lanes, width of road, type of road, lane markings, etc. The applications will use the information to inform the driver of coming situations and to assist him to drive safe. ADAS quality precision requires zooming to have images wherein 1 pixel on a screen represents an area of 10×10 cm. This means that a screen having 1280 by 1024 pixels, can show an area of 128 by 102.4 meters. To digitize a straight road of 1 km requires a human to scroll every 100 m and to digitize one point. Scrolling means that the image has to be refreshed from the image database. Both refreshing the image and digitizing one point are time consuming.

Therefore, methods are needed which can accurately, efficiently and rapidly extract horizontal road features and corresponding position information from aerial orthorectified images, satellite images, aerial image sequences or image sequences captured by a camera mounted on a moving vehicle. There is a need for algorithms to speed up road geometry update and acquisition of new road geometry.

DEFINITIONS

Coordinate: one of a sequence of n numbers designating the position of a point in n-dimensional space;
Coordinate conversion: change of coordinates, based on a one-to-one relationship, from one coordinate reference system to another based on the same datum;
Coordinate reference system: coordinate system which is related to the real world by a datum;
Coordinate system: set of mathematical rules for specifying how coordinates are to be assigned to points;
Datum: parameter or set of parameters that define the position of the origin, the scale, and the orientation of a coordinate reference system;
Ellipsoidal coordinate system (geodetic coordinate system): coordinate system in which position is specified by geodetic latitude, geodetic longitude and (in three-dimensional case) ellipsoidal height, associated with one or more geographic coordinate reference systems;
Geographic coordinate reference system: coordinate reference system using an ellipsoidal coordinate system and based on an ellipsoid that approximates the shape of the earth;
Map Projection: coordinate conversion from an ellipsoidal coordinate system to a plane;
Orthorectified view: view of a point from a chosen reference surface along a line perpendicular to that surface in said point;
Projected coordinate reference system: coordinate reference system derived from a two-dimensional geographic coordinate reference system by applying a map projection and using a Cartesian coordinate system.

SUMMARY OF THE INVENTION

The present invention seeks to provide an improved method of capturing or verifying linear features along a reference-line across a surface for use in a map database.

According to the present invention, the method comprises:
generating from reference-line data representative of coordinates of said reference-line in a geographic coordinate reference system and source images of the surface adjacent to said reference-line and associated position and orientation data in said geographic coordinate reference system, a reference-line referenced data set, wherein the reference-line referenced data set comprises a plurality of sets of image data and associated data defining a reference-line across a surface in the geographic coordinate reference system, the sets of image data having pixels wherein a set of image data corresponds to an orthorectified view representation of a line section of the surface in the geographic coordinate reference system, each set of image data comprises a reference pixel being associated with a position on the reference-line, wherein each pixel represents a surface having a position at a predefined distance from the position of the reference pixel along the line section, and wherein the line section perpendicularly crosses the reference-line at the position associated with the reference pixel; and,
post processing the reference-line referenced data set to produce linear features along the reference-line and associated locations in the geographic coordinate reference system for use in a map database.

The invention is based on the recognition that linear road information, such as lane dividers, road sides, road centerline etc., is road information which is parallel to the direction of the road. The direction of a road can be obtained from a map database. Furthermore, the driving direction of a vehicle on a road is a good approximation of the direction of a road. The position and orientation of the vehicle is determined by means of a GPS receiver and an inertial measuring device, such as one or more gyroscopes and/or accelerometers. In this way a track-line of the vehicle can be made in a geographic coordinate reference system. The track-line is a good approximation of the direction of the road. On an orthorectified image, a road and thus the track-line of a vehicle or linear road information will be curved. The idea is to transform the area along a reference-line, for example the track-line of a vehicle, in the orthorectified image into a reference-line referenced image wherein the reference-line and areas parallel to the reference-line are a straight line and rectangles along the straight line. In this way, a curved road with constant width will be transformed into an image of an almost straight road with almost parallel road sides, a reference-line according to a centerline or lane markings will be almost straight lines in a reference-line referenced image. The degree of straightness of the linear features in the reference-line referenced image depends on the accuracy of the position of the reference-line with respect to the linear features. If the vehicle drives always in the middle of one lane, the linear features will be substantially straight. However, if the vehicle changes lanes, he will cross a lane divider, this will be seen as a horizontal change of the lane divider in subsequent rows of pixels in the reference-line referenced image. As stated above the linear features in such an image are much easier and faster to digitize or verify by a human then would be the case when using the original orthorectified image. As the performed transformation is reversible, the exact geo-position of a linear feature can be derived from the positions of a feature determined in the reference-line referenced (straight line) image. The orthorectified geo-referenced space to reference-line referenced image space (RRI Space) transformation allows a human to analyze at least 20 times more information at one time. Another advantage of a reference-line referenced image is that the human analyzing the road surface only needs to scroll up and down in the image to move along the road surface, whereas he has to scroll in 2-dimensions in the image if he would like to move along the road on an orthorectified image. In this way, the human can move fast along the road surface to located a required position.

Furthermore, by transforming a curved road into a straight road, less complicated image processing algorithms are needed to detect linear road information in the reference-line referenced images. If the reference-line is projected on a column of pixels in the reference-line referenced image, the linear road information will appear as vertical information in the reference-line referenced images. The algorithms only needs to find vertical information in the image.

By means of the invention, the linear road information of a particular area, e.g. roads within a region, can be captured or edited much faster. This reduces the cost to manufacture the information, but also reduces the time between capturing the images and providing the road information to a customer. The invention further enables digital map providers to provide more frequently updates of a digital map.

According to the invention a method of generating a reference-line referenced data set comprises:

acquiring reference-line data representative of the coordinates of said reference-line in a geographic coordinate reference system;

acquiring source images of a surface adjacent to said reference-line and associated position and orientation data in said geographic coordinate reference system;

generating a sequence of sample positions on the reference-line;

determining for each sample position, the location of a line section perpendicular to the direction of the reference-line at said sample position;

generating a line of pixels for each line section, wherein each pixel has an associated pixel position in the geographic coordinate reference system on the surface and the pixel value has been derived from at least one pixel of the source images representative of said associated pixel position;

storing the lines of pixels and associated sample positions in the reference-line referenced data set.

The source images could be taken from one of the group: images captured by a terrestrial camera mounted on a moving vehicle, aerial images, satellite images, orthorectified images. The reference-line could be taken from one of the group: track line of the vehicle, road centerline from existing database, other existing road geometry taken from an existing database.

In an embodiment of the invention, the sample positions are equidistant along the reference-line. This feature allows a software program to provide without transformation a reference-line referenced image which is easy to interpret by a human.

In another embodiment of the invention, the distance along the reference-line between two subsequent sample positions in the geographic coordinate reference system depends on the local curvature or straightness of the reference-line. This feature enables the method to provide a reference-line referenced data set with an optimal amount of data. Fewer points are needed to accurately derive the linear road information on straight sections of a road then on bended sections.

According to the invention a method of post processing a reference-line referenced data set to produce linear features along a reference-line across a surface and associated locations in a geographic coordinate reference system for use in a map database comprises:

retrieving the reference-line referenced data set, wherein the reference-line referenced data set comprises a plurality of sets of image data and associated data defining a reference-line across a surface in a geographic coordinate reference system, the sets of image data having pixels wherein a set of image data corresponds to an orthorectified view representation of a line section of the surface in the geographic coordinate reference system, each set of image data comprises a reference pixel being associated with a position on the reference-line, wherein each pixel represents a surface having a position at a predefined distance from the position of the reference pixel along the line section, and wherein the line section perpendicularly crosses the reference-line at the position associated with the reference pixel;

transforming the reference-line referenced data set into a reference-line referenced image wherein one or more source images to obtain a transformed image in dependence of the road position information, wherein each column of pixels of the transformed image corresponds to a surface parallel to the direction of said road;

selecting a linear feature in the reference-line referenced image;

determining coordinates in the geographic coordinate reference system of the linear feature from the position of the linear feature in the reference-line referenced image and associated data;

storing the coordinates of the linear feature in a database.

The linear feature is one of the group: road centerline, road width, road curb, road painting, lane divider, number of lanes, traffic island, junctions and any other visual distinguishing feature of the surface along the reference-line.

In an embodiment of the invention selecting comprises:

outputting the reference-line referenced image on a screen;

manually positioning a pointing device on the linear feature on the screen to obtain marked positions; and determining calculates the coordinates in the geographic coordinate system of the linear feature from the marked positions.

These features allow us to use humans to analyze the reference-line referenced images and to produce the linear road information.

In another embodiment selecting comprises:

performing a line detection algorithm on the reference-line referenced image to select the linear feature;

determining positions of linear feature in reference-line referenced image; and, determining calculates the coordinates in the geographic coordinate system of the linear feature from the pixel positions of the linear feature in the reference-line referenced image.

These features allow us to produce automatically the linear road information from the reference-line referenced data sets.

In another aspect, the invention provides a reference-line referenced data set comprising a plurality of sets of image data and associated data defining a reference-line across a surface in a geographic coordinate reference system, the sets of image data having pixels wherein a set of image data corresponds to an orthorectified view representation of a line section of the surface in the geographic coordinate reference system, each set of image data comprises a reference pixel being associated with a position on the reference-line, wherein each pixel represents a surface having a position at a predefined distance from the position of the reference pixel along the line section, and wherein the line section perpendicularly crosses the reference-line at the position associated with the reference pixel.

In an embodiment of the reference-line referenced data set the surface is the earth surface and a line section includes a section of a surface of a road. In an embodiment of the reference-line referenced data set, the plurality of sets of image data is a reference-line referenced image, wherein each set of image data corresponds to a row of pixels of the reference-line referenced image. In another embodiment, the positions of the pixels of a set of image data are proportionally distributed along the line section when projected on the geographic coordinate reference system. In yet another embodiment, the reference-line corresponds to an approximation of a road centerline.

And in a further embodiment, the geographic coordinate reference system is the WGS84 coordinate system.

In another aspect, the invention provides a computer implemented system for verifying linear features along a reference-line and associated locations in a geographic coordinate reference system, the system comprising:
  an input device;
  a processor readable storage medium; and
  a processor in communication with said input device and said processor readable storage medium;
  an output device to enable the connection with a display unit; said processor readable storage medium storing code to program said processor to perform a method comprising the actions of:
  retrieving from a map database reference-line data representative of coordinates of a reference-line across a surface in a geographic coordinate reference system;
  retrieving an orthorectified image of said surface and associated position and orientation data in said geographic coordinate reference system;
  generating from the reference-line data and orthorectified images a reference-line referenced image, wherein each row of pixels of the referenced-line referenced image corresponds to a section of said surface perpendicular to the direction of the reference-line and each column of pixels of the reference-line referenced image corresponds to a surface parallel to the reference-line;
  verifying the position of linear features in the reference-line referenced image;
  marking positions showing defects with respect to at least one requirement taken from the group: position of linear feature, straightness of linear feature, parallelism of linear features;
  determining coordinates in the geographic coordinate reference system corresponding to the marked positions showing defects; and,
  storing the coordinates of the marked defects in a database for further processing.

Reference-line referenced images according to the invention, enables humans to verify efficiently and easily the positions of linear features in existing map databases. The position of a linear feature, e.g. lane divider, taken from an existing map database can be used as reference-line. The orthorectified images visualizes the real surface of the earth when projected on the ellipsoid that approximates the shape of the earth used by a geographic coordinate reference system. In the reference-line referenced image, the linear feature should be visual on a predefined position in the image. Furthermore, a linear feature should be a straight line. If the position is incorrect or the linear feature is not a straight line, a human will recognize this as a defect and could mark the defect. Subsequently, the geo-position of the defect is determined by the projected coordinate reference system associated with the pixels of the reference-line referenced image. The geo-positions of the defects can be used to retrieve corresponding source images from a mobile mapping vehicle or a corresponding orthorectified image, to digitize again the linear feature in the images with relative high resolution. In this way, data in existing map databases can be verified efficiently and corrected if necessary.

The present invention can be implemented using software, hardware, or a combination of software and hardware. When all or portions of the present invention are implemented in software, that software can reside on a processor readable storage medium. Examples of appropriate processor readable storage medium include a floppy disk, hard disk, CD ROM, DVD, memory IC, etc. When the system includes hardware, the hardware may include an output device (e.g. a monitor, speaker or printer), an input device (e.g. a keyboard, pointing device and/or a microphone), and a processor in communication with the output device and processor readable storage medium in communication with the processor. The processor readable storage medium stores code capable of programming the processor to perform the actions to implement the present invention. The process of the present invention can also be implemented on a server that can be accessed over telephone lines or other network or internet connection.

SHORT DESCRIPTION OF DRAWINGS

The present invention will be discussed in more detail below, using a number of exemplary embodiments, with reference to the attached drawings that are intended to illustrate the invention but not to limit its scope which is defined by the annexed claims and its equivalent embodiment, in which FIG. 1 shows a MMS system with a camera and a laser scanner;

DETAILED DESCRIPTION OF EXEMPLARY EMBODIMENTS

Figure 1:
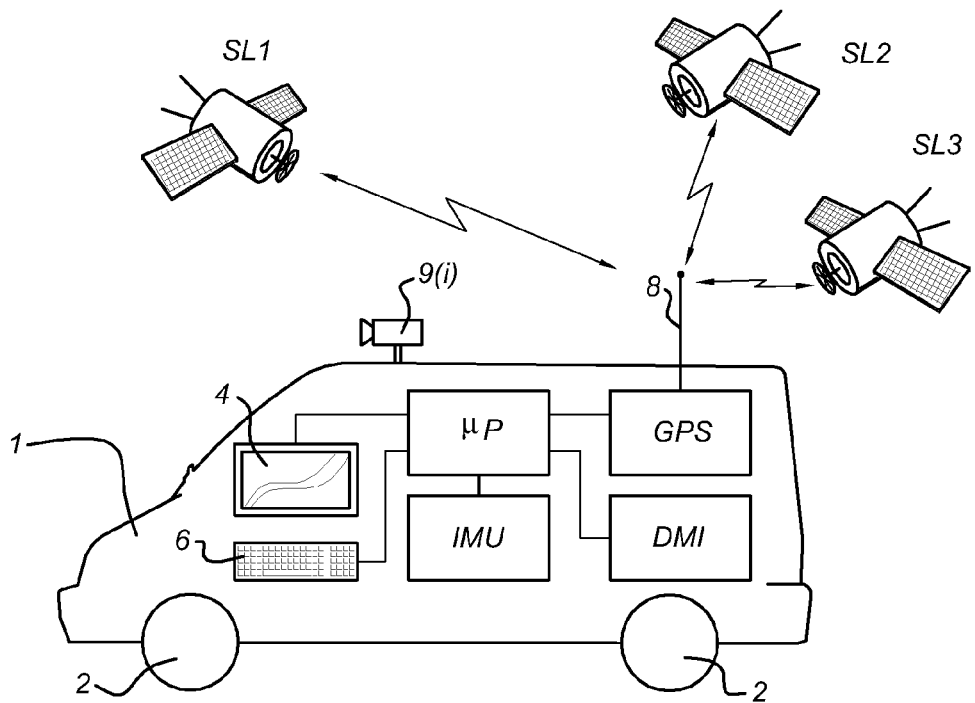

FIG. 1 shows a MMS system that takes the form of a car 1. The car 1 is provided with one or more cameras 9(i), i=1, 2, 3, . . . I. The looking angle or the one or more cameras 9(i) can be in any direction with respect to the driving direction of the car 1 and can thus be a front looking camera, a side looking camera or rear looking camera, etc. The viewing window(s) of the camera(s) 9(i) cover(s) the whole road surface in front the vehicle. Preferably, the angle between the driving direction of the car 1 and the looking angle of a camera is within the range of 45 degree-135 degree on either side. The car 1 can be driven by a driver along roads of interest.

The car 1 is provided with a plurality of wheels 2. Moreover, the car 1 is provided with a high accuracy position determination device. As shown in FIG. 1, the position determination device comprises the following components:

a GPS (global positioning system) unit connected to an antenna 8 and arranged to communicate with a plurality of satellites SLi (i=1, 2, 3, . . . ) and to calculate a position signal from signals received from the satellites SLi. The GPS unit is connected to a microprocessor μP. Based on the signals received from the GPS unit, the microprocessor μP may determine suitable display signals to be displayed on a monitor 4 in the car 1, informing the driver where the car is located and possibly in what direction it is traveling. Instead of a GPS unit a differential GPS unit could be used. Differential Global Positioning System (DGPS) is an enhancement to Global Positioning System (GPS) that uses a network of fixed ground based reference stations to broadcast the difference between the positions indicated by the satellite systems and the known fixed positions. These stations broadcast the difference between the measured satellite pseudoranges and actual (internally computed) pseudoranges, and receiver stations may correct their pseudoranges by the same amount.

a DMI (Distance Measurement Instrument). This instrument is an odometer that measures a distance traveled by the car 1 by sensing the number of rotations of one or more of the wheels 2. The DMI is also connected to the microprocessor μP to allow the microprocessor μP to take the distance as measured by the DMI into account while calculating the display signal from the output signal from the GPS unit.

an IMU (Inertial Measurement Unit). Such an IMU can be implemented as 3 gyro units arranged to measure rotational accelerations and translational accelerations along 3 orthogonal directions. The IMU is also connected to the microprocessor μP to allow the microprocessor μP to take the measurements by the DMI into account while calculating the display signal from the output signal from the GPS unit. The IMU could also comprise dead reckoning sensors.

It will be noted that one skilled in the art can find many combinations of Global Navigation Satellite systems and on-board inertial and dead reckoning systems to provide an accurate location and orientation of the vehicle and hence the equipment (which are mounted with know positions and orientations with references to the vehicle).

The system as shown in FIG. 1 is a so-called "mobile mapping system" which collects geographic data, for instance by taking pictures with one or more camera(s) 9(i) mounted on the car 1. The camera(s) are connected to the microprocessor μP. The camera(s) 9(i) in front of the car could be a stereoscopic camera. The camera(s) could be arranged to generate an image sequence wherein the images have been captured with a predefined frame rate. In an exemplary embodiment one or more of the camera(s) are still picture cameras arranged to capture a picture every predefined displacement of the car 1 or every interval of time. The predefined displacement is chosen such that a location at a predefined distance in front of the vehicle is captured be at least two subsequent pictures of a camera. For example a picture could be captured after each 4 meters of travel, resulting in an overlap in each image of a the road surface plane 5 meters distance heading the vehicle.

It is a general desire to provide as accurate as possible location and orientation measurement from the 3 measurement units: GPS, IMU and DMI. These location and orientation data are measured while the camera(s) 9(i) take pictures. The pictures are stored for later use in a suitable memory of the μP in association with corresponding location and orientation data of the car 1, collected at the same time these pictures were taken. The pictures include visual information as to road information, such as center of road, road surface edges and road width.

Figure 2:
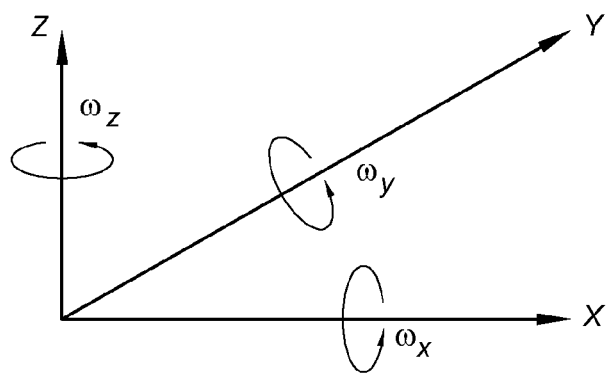
FIG. 2 shows a diagram of location and orientation parameters.

FIG. 2 shows which position signals can be obtained from the three measurement units GPS, DMI and IMU shown in FIG. 1. FIG. 2 shows that the microprocessor μP is arranged to calculate 6 different parameters, i.e., 3 distance parameters x, y, z relative to an origin in a predetermined coordinate system and 3 angle parameters $\omega_x$, $\omega_y$, and $\omega_z$, respectively, which denote a rotation about the x-axis, y-axis and z-axis respectively. The z-direction coincides with the direction of the gravity vector. The global UTM or WGS84 coordinate system could be used as predetermined geographic coordinate reference system.

The microprocessor in the car 1 and memory 9 may be implemented as a computer arrangement. An example of such a computer arrangement is shown in FIG. 3.

Figure 3:
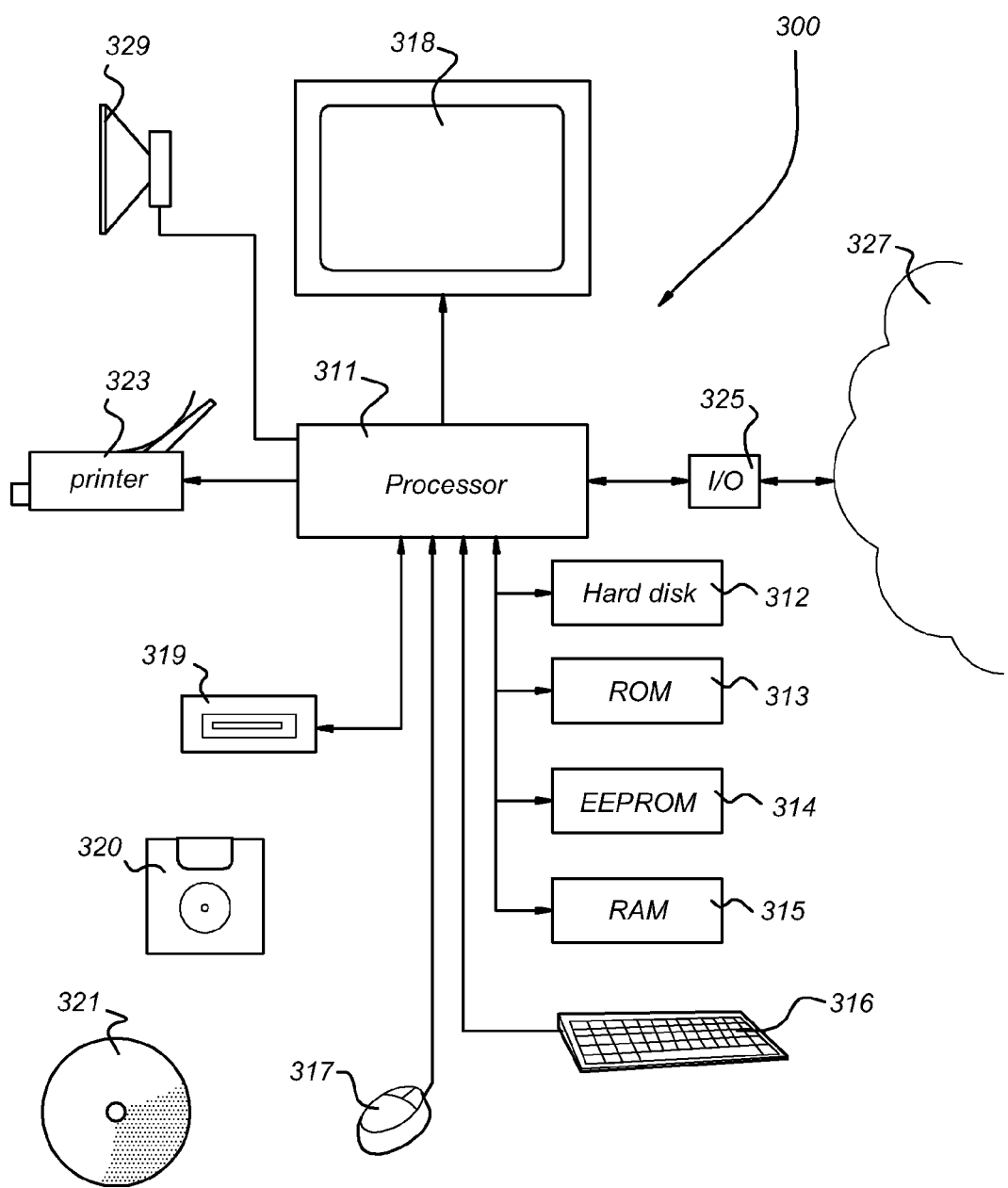
FIG. 3 shows a block diagram of a computer arrangement with which the invention can be performed.

In FIG. 3, an overview is given of a computer arrangement 300 comprising a processor 311 for carrying out arithmetic operations. In the embodiment shown in FIG. 1, the processor would be the microprocessor μg.

The processor 311 is connected to a plurality of memory components, including a hard disk 312, Read Only Memory (ROM) 313, Electrical Erasable Programmable Read Only Memory (EEPROM) 314, and Random Access Memory (RAM) 315. Not all of these memory types need necessarily be provided. Moreover, these memory components need not be located physically close to the processor 311 but may be located remote from the processor 311.

The processor 311 is also connected to means for inputting instructions, data etc. by a user, like a keyboard 316, and a mouse 317. Other input means, such as a touch screen, a track ball and/or a voice converter, known to persons skilled in the art may be provided too.

A reading unit 319 connected to the processor 311 is provided. The reading unit 319 is arranged to read data from and possibly write data on a removable data carrier or removable storage medium, like a floppy disk 320 or a CDROM 321.

Other removable data carriers may be tapes, DVD, CD-R, DVD-R, memory sticks etc. as is known to persons skilled in the art.

The processor 311 may be connected to a printer 323 for printing output data on paper, as well as to a display 318, for instance, a monitor or LCD (liquid Crystal Display) screen, or any other type of display known to persons skilled in the art.

The processor 311 may be connected to a loudspeaker 329.

Furthermore, the processor 311 may be connected to a communication network 327, for instance, the Public Switched Telephone Network (PSTN), a Local Area Network (LAN), a Wide Area Network (WAN), the Internet etc by means of I/O means 325. The processor 311 may be arranged to communicate with other communication arrangements through the network 327. The I/O means 325 are further suitable to connect the position determining device (DMI, GPS, IMU), camera(s) 9($i$) and laser scanner(s) 3($j$) to the computer arrangement 300.

The data carrier 320, 321 may comprise a computer program product in the form of data and instructions arranged to provide the processor with the capacity to perform a method in accordance to the invention. However, such computer program product may, alternatively, be downloaded via the telecommunication network 327.

The processor 311 may be implemented as a stand alone system, or as a plurality of parallel operating processors each arranged to carry out subtasks of a larger computer program, or as one or more main processors with several sub-processors. Parts of the functionality of the invention may even be carried out by remote processors communicating with processor 311 through the telecommunication network 327.

The components contained in the computer system of FIG. 3 are those typically found in general purpose computer systems, and are intended to represent a broad category of such computer components that are well known in the art.

Thus, the computer system of FIG. 3 can be a personal computer, workstation, minicomputer, mainframe computer, etc. The computer can also include different bus configurations, networked platforms, multi-processor platforms, etc. Various operating systems can be used including UNIX, Solaris, Linux, Windows, Macintosh OS, and other suitable operating systems.

For post-processing the images and scans as taken by the camera(s) 9($i$) and position/orientation data; a similar arrangement as the one in FIG. 3 will be used, be it that that one will not be located in the car 1 but may conveniently be located in a building for off-line post-processing. The images as taken by camera(s) 9($i$) and associated position/orientation data are stored in one or more memories 312-315. That can be done via storing them first on a DVD, memory stick or the like, or transmitting them, possibly wirelessly, from the memory 9. The associated position and orientation data, which defines the track of the car 1 could be stored as raw data including time stamps. Furthermore, each image has a time stamp. The time stamps enables us to determine accurately the position and orientation of the camera(s) 9($i$) at the instant of capturing an image. In this way the time stamps define the spatial relation between views shown in the images. The associated position and orientation data could also be stored as data which is linked by the used database architecture to the respective images. A geo-coded image sequences is the combination of image sequences and associated position and orientation data. The geo-coded image sequences are used to generated orthorectified images. These orthorectified images are comparable to aerial orthorectified images but with improved resolution and absolute geo-position. A method of generating orthorectified images and associated position and orientation data is disclosed in unpublished patent application PCT/NL2006/050252. A typical Mobile Mapping System MMS produces with the method an orthorectified mosaic that has a 8 cm resolution with an absolute position accuracy of 1 m.

The present invention can use as image data any orthorectified image with sufficient resolution and accuracy. Thus orthorectified aerial images, orthorectified satellite images as well as orthorectified images obtained from images captured by a camera mounted on a moving vehicle. It should be noted that the raw image sequences captured by a mobile mapping system could also be used as input data. This will be explained in more detail below.

Figure 4:
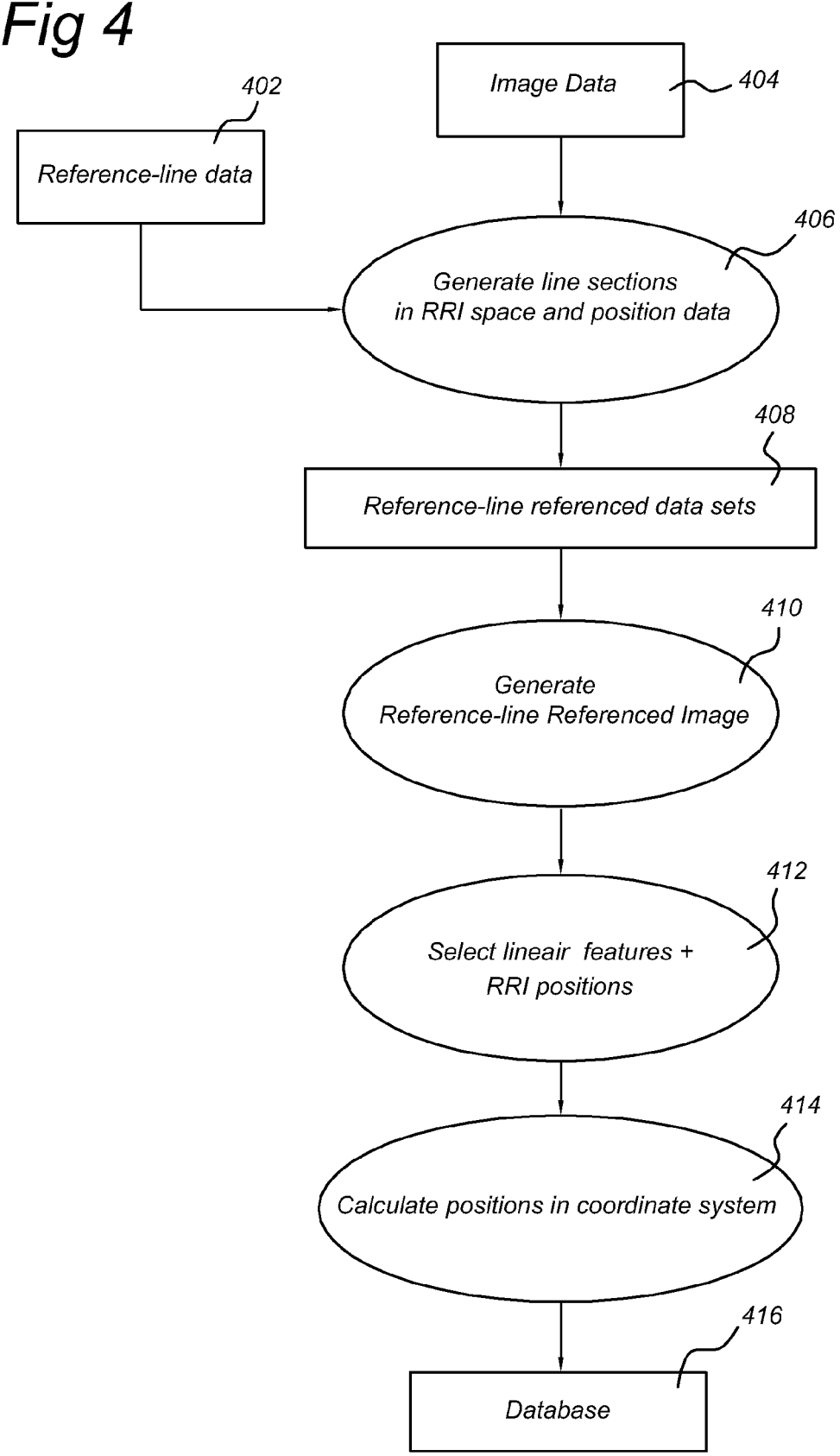
FIG. 4 is a flow diagram of an exemplar implementation of the process for producing linear road information according to the invention.

FIG. 4 is a flow diagram of an exemplar implementation of the process for producing linear road information according to the invention. Linear road information could be and is not limited to the road width, position of road centerline, number of lanes, position, type and dimensions of lane dividers, width of lanes, position and dimensions of traffic islands, position and dimensions of parking/emergency stops, position and dimensions of junctions with exit lane along the road. Input data for the process are reference-line data 402 and image data 404. The reference-line data corresponds to the reference-line across the earth surface. The reference-line is preferably specified in a standard geographic coordinate reference system, for example the WGS84 geographic coordinate reference system. The reference-line could be the track of a mobile mapping vehicle during an Mobile Mapping Session. If so, the image sequences captured and the reference-line will have position and orientation data generated by the same position determination device. This provides an exact match between the position of the reference-line and information retrieved from the images. However, the reference-line data could also be extracted from a digital map database. The reference-line could correspond to the route determined by a route planning system from position a to position b. The image data 404 could any orthorectified image with metadata defining the corresponding projected coordinate reference system. Consequently, every pixel of the image can be mapped to real world coordinates and any world coordinate can be found on the image. For the process according to the invention it is important that the projected coordinate reference system associated with the pixels of the orthorectified image and the projected coordinate reference system associated with the pixels of the reference-line referenced data set enable a program to project a pixel of the reference-line referenced data 402 on a pixel of the image data 404. The image data is used to determine linear road features along the reference-line. If the position information does not match the method is not able to determine the relevant areas in the images encompassing the linear road feature. A mobile mapping vehicle drives on a road. Therefore, the track line of the mobile mapping vehicle is a good approximation of the position of the road. If the image sequences captured by the mobile mapping vehicle are used to generate an orthorectified image if the road, the track line of the vehicle can exactly be determined in the orthorectified image. Thus a reference-line according to the track line of a mobile mapping vehicle enables us to determine where to find in the orthorectified image the parts which comprise the road information we are looking for.

As stated above, the reference-line data is used to determine the parts of the orthorectified image to be analyzed. In action 406, the parts of the orthorectified image to be analyzed are transformed from orthorectified image space to reference-line referenced image space. As a result of this transformation, the curved reference-line in orthorectified image space is transformed to a straight line in reference-line referenced image space. Furthermore, locations in the orthorectified image space at a perpendicular distance $d_{ort}$ from the reference-line are projected at locations at a perpendicular distance $d_{RRI}$ from the referenced-line in the reference-line referenced image space. Consequently, all locations at a perpendicular distance $d_{ort}$ are projected on a straight line parallel to the reference-line in the reference-line referenced image space at distance $d_{RRI}$. This transformation will be described in more detail in the description below. Output of action 406 are reference-line referenced data sets 408. A reference-line referenced data set comprises a plurality of sets of image data and associated position data defining a reference-line across a surface in a coordinate system, e.g. geographic coordinate reference system such as WGS84 and UTM. Each set of image data consists of a linear array of pixels and metadata defining the associated projected coordinate reference system. A linear array of pixels can be a line of pixels of a reference-line referenced image. The linear array of pixels corresponds to a orthorectified view representation of a line section of the surface in the coordinate system. An orthorectified image is an orthorectified view representation of the earth surface. It should be noted that an orthorectified image comprises metadata defining the used map projection. The map projection defines the transformation of the two-dimensional curved surface model of the earth to a plane. An orthorectified image is a suitable image to generate the linear array of pixels as the geo-position (the position of the two-dimensional curved surface of the earth) of each pixel is clearly defined. Each set of image data comprises a reference pixel being associated with a position on the reference-line. Furthermore, each pixel represents a surface having a position at a predefined distance from the position at said surface of the reference pixel along the line section. The line section perpendicularly crosses the reference-line at the position associated with the reference pixel. When an orthorectified image is the source image, the values of the linear array of pixels correspond to the values of a line section in the orthorectified image which is perpendicular to the reference-line at a defined location in the orthorectified image. Positions on the reference-line are defined. For each position on the reference-line, corresponding image data is derived from the orthorectified image. The combination of the image data in the linear arrays results in a reference-line referenced image. Block 410 indicates the combination of the image data and metadata enabling the calculation of the geo-position of each pixel to generate a reference-line referenced image with metadata enabling the calculation of the geo-position of each pixel accurately.

Figure 5:
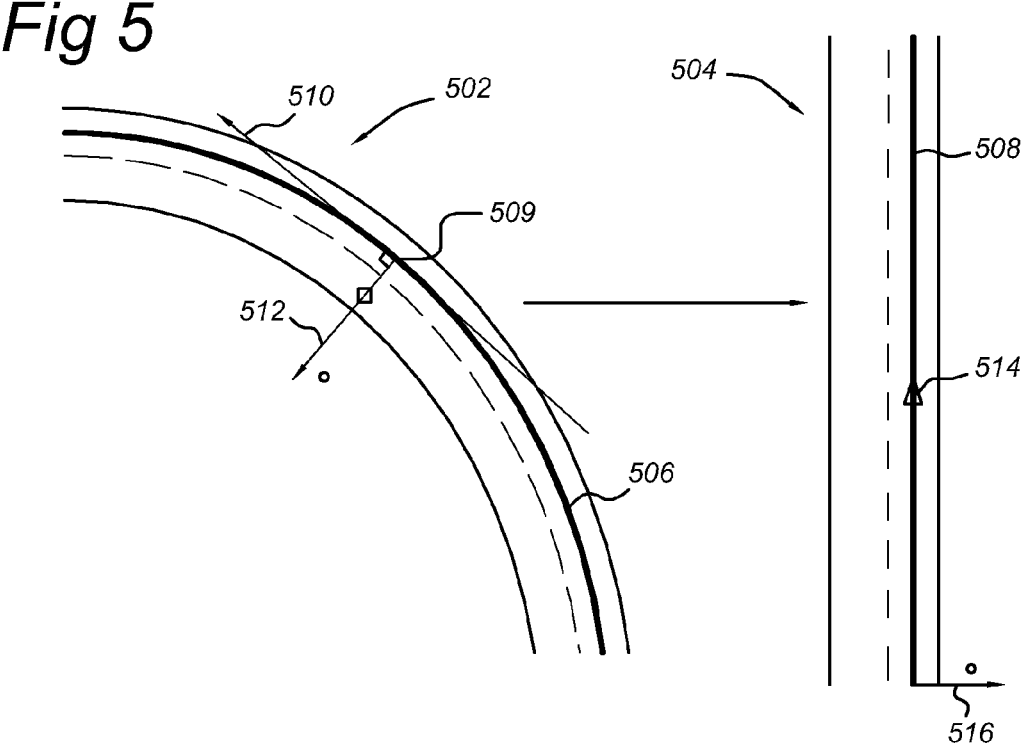
FIG. 5 illustrates the transformation from orthorectified image space to reference-line referenced image space.

As state above the reference-line referenced data set comprises data to compose a reference-line referenced image. In a reference-line referenced image each column of pixels corresponds to a curve in the orthorectified image which is parallel to the reference-line. The present invention is used to produce linear road information. This is information which is substantially parallel to the reference line, e.g. the direction of the road. By the transformation from orthorectified image to reference-line referenced image, a curved road with constant width is transformed in a straight road with constant width. FIG. 5 illustrates the transformation from orthorectified image space to reference-line referenced image space. The left hand image shows an orthorectified images of a bend of a road 502. Furthermore, the track line of a vehicle 506 is indicated. Furthermore, a vector 510 indicates the direction of the reference-line in a point 509 and a vector 512 defines the direction of a line section perpendicular to the direction of the reference-line 506. The right hand image shows the result of the orthorectified image space to reference-line referenced image space transformation of the left hand image. It can be seen that the reference-line corresponds to a vertical line 508 in the reference-line referenced image and the curved center-line and road sides in the orthorectified image are transformed to vertical lines parallel to the vertical line 508.

Block 412 indicates the method to select linear features from the reference-line referenced image and the xy-position in the image. The method can be done by a human who digitizes the image. A human will see an almost straight road on the screen. By means of pointing means, such as a pointer, the human can mark the position of the linear features in the screen. The marked position in the linear reference image on the screen is stored for further processing. The number of marks to select a linear feature depends on the straightness of the linear feature in the linear reference image. The straightness of the linear feature depends on the parallelism of the reference-line and the feature in the orthorectified image. For example, if the moving vehicle is moving lanes, this movement is visible as horizontal movement of the feature in the reference-line referenced image. To select accurately the linear feature in the reference-line referenced image, the marks added by the human has to follow this movement. If the reference-line is parallel to the linear feature in the orthorectified image, only the begin and end point of the linear feature have to be marked in the reference-line referenced image.

Block 412 can also be implemented by an image processing algorithm. There are numerous algorithms know to the humans skilled in the art to detect linear features in images. As the used algorithm is not an essential feature of the invention, further details of such an algorithm are not described. As in a reference-line referenced image the linear features to be detected appear as lines having an angle with respect to a column of pixels smaller than 45 degrees, which is in an embodiment smaller than 5 degrees, simple line detection algorithms can be used to detect the linear features. If the reference-line corresponds to the track-line of a mobile mapping vehicle, the linear features will be mainly shown as vertical lines in the reference-line referenced images.

Block 412 can also be a method for verifying linear features along a reference-line and associated locations in a coordinate system. In that case, the reference-line could correspond to the positions of any linear feature retrieved from an existing digital map database. The positions are used to generate the reference-line referenced image. The orthorectified images or raw source images from a mobile mapping session visualize the real surface of the earth. In an embodiment, the middle column of pixels of a reference-line referenced image correspond to the position of the linear feature taken from the existing map database. If the position of the linear feature is correct, the linear feature will be visualized in the middle column and thus be seen as a straight line. However, if the position in the database is incorrect, the linear feature will not be visualized in the middle column of pixels in the reference-line referenced image. Furthermore, if a linear feature is not a straight line in the reference-line referenced image, this is an indication that the reference-line is not digitized correctly in the digital map database. A human will recognize both situations as a defect in the digital map database and could mark the defect in the reference-line reference image. Subsequently, the geo-position of the defect corresponding to the position of the mark in the reference-line referenced image is determined and stored in a database. The geo-positions of the defects can be used to retrieve corresponding source images from a mobile mapping vehicle or a corresponding orthorectified image, to digitize again the linear feature in images with a high 2D-resolution, such as an orthorectified image. In this way, data in existing map databases can be verified efficiently and corrected if necessary. The verification method can be improved by taking as a reference line the direction of the road, e.g. centerline, and superposing the positions of linear features, such as road width, road markings, in the reference-line referenced image. An advantage of the reference-line referenced image is that a human has to scroll only up and down in the image to move along the road. Furthermore, the resolution along the road (linear feature) could be varied without losing position accuracy in a direction perpendicular to the direction of the road. This is elucidate in FIG. 13 and corresponding description.

In block 414 the position in the geographic coordinate reference system of the selected linear feature in block 412 is calculated from the xy-position of the linear feature in the reference-line referenced image. The projected coordinate reference system associated with each pixel defines the coordinate conversion from reference-line referenced image space to geographic coordinate reference system space. Finally, the linear feature and corresponding position in the geographic coordinate reference system is stored in a database for use in a map database.

In the following paragraphs the mathematics of reference-line referencing will be given.

Let n be a natural number, r a natural number or ∞, I be a non-empty interval of real numbers and t in I. A vector valued function $$\gamma: I \to \mathbb{R}^n$$

of class Cr (i.e. γ is r times continuously differentiable) is called a parametric curve of class Cr or a Cr parameterization of the curve γ. t is called the parameter of the curve γ. γ(I) is called the image of the curve.

For a 2-dimensional space, e.g. an image, such curve will therefore have following form $$\gamma(t) = [x(t), y(t)]$$

For the C1 class curve at each point we can define it's tangent and normal vectors which can be computed from following equation:

The unit tangent vector is the first Frenet vector $e_1(t)$ and is defined as $$e_1(t) = \frac{\gamma'(t)}{\|\gamma'(t)\|}$$

A normal vector, sometimes called the curvature vector, indicates the deviance of the curve from being a straight line.

The normal vector is defined as $$\overline{e_2}(t) = \gamma''(t) - \langle \gamma''(t), e_1(t) \rangle e_1(t)$$

Its normalized form, the unit normal vector, is the second Frenet vector e2(t) and is defined as $$e_2(t) = \frac{\overline{e_2}(t)}{\|\overline{e_2}(t)\|}$$

Each point in the neighbourhood of the line can be represented as reference-line referenced in the following form:

$$P(t,o) = \gamma(t) + o * e2(t)$$

This principle can be applied to any pixel on an image that is georeferenced and is in neighbourhood of the line.

Figure 6:
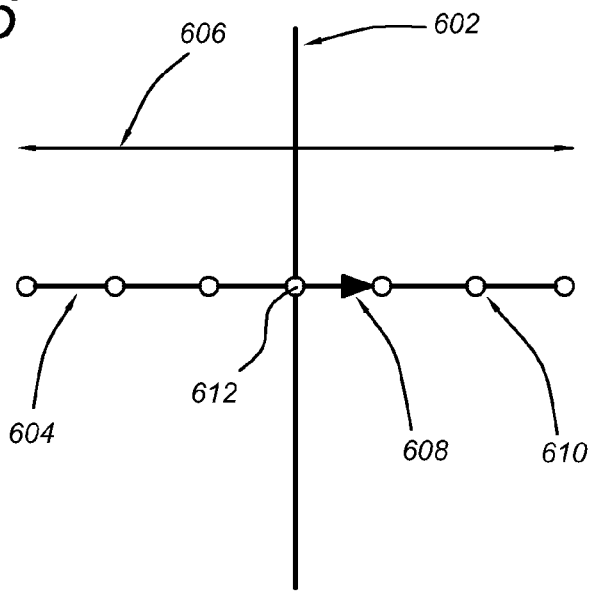
FIG. 6 illustrates the generation of an image data set.

The reference-line referenced images transformation algorithm is illustrated in FIG. 6 and comprises the following actions:

1. Let's define d(n) 610 as a sequence of distance along reference geometry points 612, where n is ordering number in sequence, so that d(n)<d(n+1) and 0<=d(n)<=G, where G is reference geometry width.

Reference geometry is sampled with distances along resulting from vector d(n). Value R(n)=d(n)–d(n−1) can be treated as local resolution in first or horizontal axis of linear reference image.

2. For each element from vector d(n) perform following:
   2.1. Query point and geometry direction vector p 608 perpendicular to reference geometry 602 at distance D=d(n);
   2.2. Create source image sampling line 604 using direction vector p 608 and given sample line width 606. Sample this line with given step. As a result we get sequence of points 610. Let we assume that result points Pt(n, m) are ordered from left to right in direction according to geometry direction, where n is the index of current element of vector d(n) and m is ordering number of point at reference-line.
   2.3. For each of the points Pt(n, m) created in pt. 2.2:
      2.3.1. Using well known spatial reference system conversions to find the pixel (or group of pixels) corresponding to point Pt(n, m) on source orthorectified image.
      2.3.2. Perform any image processing operations on found pixel (or group of pixels) to get result pixel value.
      2.3.3. Set pixel value resulting from 2.3.2. into result reference-line referenced image at pixel location (n, m).

In other words, the reference-line, which is the reference geometry, for example the road centreline or track line of a vehicle, is sampled to obtain reference-line points. Then for each reference-line point, the geometry direction vector p 608 perpendicular to the reference-line is determined. The reference-line points and the geometry direction vector are used to determine the geo-position of a line section on the orthorectified image. The line section is on a line having a direction which is perpendicular to the direction of the reference-line in a point where the line through the line section crosses the reference-line. The line section is used to generate a row of pixels. The row of pixels corresponds to geo-positions on a line. The geo-positions are equidistant and form a straight line of a reference-line referenced image. The geo-positions are used to derive the corresponding position of pixels in the geo-referenced orthorectified image. The value of a pixel of the row of pixels is determined from the values of the corresponding pixels in the geo-reference orthorectified image. The resolution of the row of pixels is in an embodiment 0.5 cm. However, the required resolution depends on a combination of the dimensions of the linear road information to be detected and the required position and dimensions accuracy in the map database. For example, the resolution of the road width will be defined by the required position accuracy, whereas the width of a road centreline could be defined by the width of the line.

The rows of pixels corresponding to subsequent reference-line points can be combined to form a reference-line referenced image. In a reference-line referenced image, the position of the reference-line is projected on one of the columns of pixels. Each other column of pixels in the reference-line referenced image corresponds to a line at a predefined perpendicular distance from the rack line.

In FIG. 6 is shown the direction of the reference-line 602 in a specific reference-line point 612. Perpendicular to the direction 602 is a line section 604. The line section has a predetermined width 606 and direction vector 608. Along the line section, a number of line section points 610 are selected. Each line section point 610 has a corresponding pixel in a row of pixels. A row of pixels can be stored as an array of pixels but also as a row of pixels in a reference-line referenced image. Each line section point has a geo-position. Preferably, one line section point has a geo-position which is at the position where the line section 604 crosses the reference-line. However, the invention could also work properly when the area of the line section does not cover the reference-line. The only constraint is to produce linear road information is that the geo-positions of the road information is parallel to the geo-position of the reference-line.

The rows of pixels corresponding to the reference-line points are stored in a reference-line referenced data set. Each row of pixels can store individual sets of data comprising image data representative of the row of pixels and position data, representative of the position and orientation of the reference-line with respect to a reference pixel of the row of pixels. By means of the position data, the geo-position of every pixel of the row of pixels can be determined accurately. In this way, each geo-referenced position of a pixel can be defined using the following values: the distance along the reference-line and the distance from the reference geometry in perpendicular direction to the direction of the reference-line.

Figure 7:
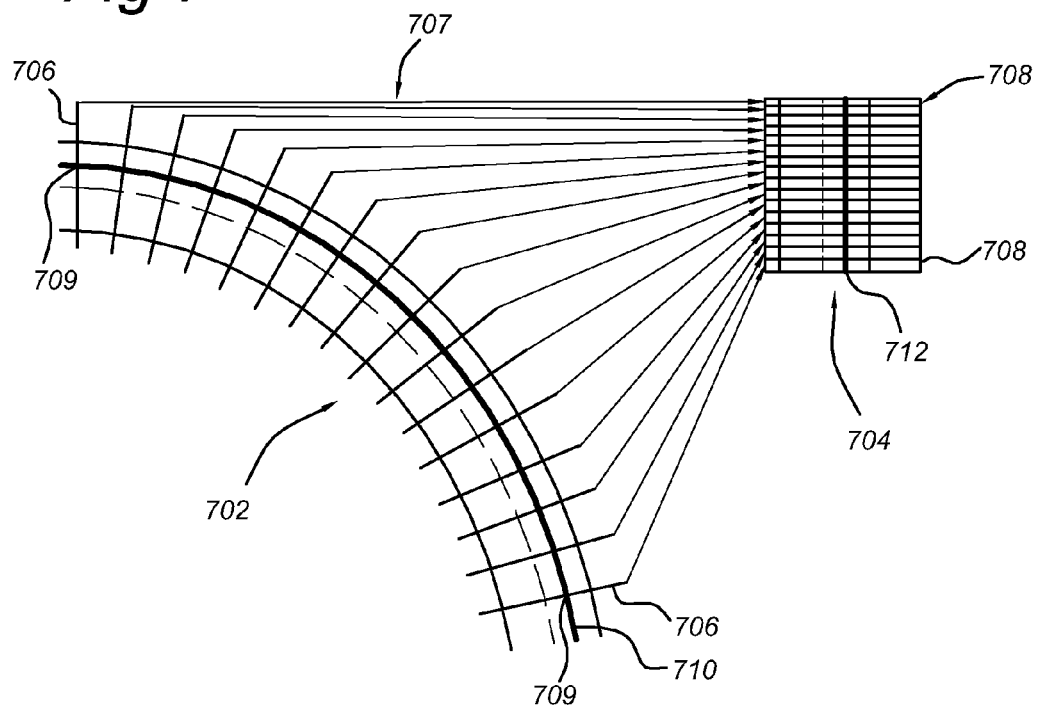
FIG. 7 illustrates the generation of a reference-line referenced image from an orthorectified image.

FIG. 7 illustrates the generation of a reference-line referenced image from an orthorectified image. FIG. 7 shows left an orthorectified image of a road 702. A reference-line 710 is superposed over the road 702. Lines sections 706 are shown. The line sections 706 have a direction which is perpendicular to the direction of the reference-line 710 where the line sections 706 crosses the reference-line 710. FIG. 7 shows at the right side a reference-line referenced image 704. Line 712 superposed on the reference-line referenced image 704 corresponds to the reference-line 710. The arrows 707 indicates the mapping from a line section 706 in the orthorectified source image to a row of pixel 706 of an reference-line referenced image 704. It can be seen that the lines having a constant perpendicular distance in an orthorectified image 702 are transformed to parallel "vertical" lines in the reference-line referenced image 704.

FIG. 7 shows an example wherein the distance along the reference-line between subsequent reference-line points 709 is equidistant. In an embodiment the distance between two reference-line points along the reference-line is 1 meter. This has the advantage that the linear reference image generated by combining the rows of pixels, is easily interpretable. It has been found that a distance between two reference-line points along the reference-line in the range of 0.08 m-2 m provides easy to interpret reference-line referenced images. The lowest distance corresponds to the resolution of the pixels of a line section, which depends on the image resolution of the source images or orthorectified images. Every predefined displacement along a column corresponds to the same displacement of the line section along the reference-line. If a human has to mark the linear features in the reference-line referenced image which cannot be visualized on one screen, the human has to scroll vertically through the reference-line referenced image. A vertical scroll of a number of lines of pixels will correspond to a movement of a corresponding distance along the reference-line.

The distance between two reference-line points along the reference-line in a reference-line referenced image could be increased further. However, in that case some pre-filtering is needed to make the image interpretable. If no pre-filtering is performed, linear features, such as dashed painted lane dividers could disappear or shown as solid lines. In an embodiment of a pre-filter, if an engineer would like to have e.g. 8 m spacing between two reference-line points, reference-line referenced data with a spacing of 1 m is generated. Each line in the reference-line referenced image is obtained by filtering 8 subsequent line sections along the reference-line. Each even line of the reference-line referenced image is obtained by storing the minimal luminance value of the pixels of the 8 subsequent line section at equivalent perpendicular distance from the reference-line point and each uneven line of the reference-line referenced image is obtained by storing the maximal luminance value of the pixels of the 8 subsequent line section at equivalent perpendicular distance from the reference-line point. In that case a human would be able to see dashed painted dividers on the image as a vertical bar with alternating black (minimal luminance) and white (maximal luminance) pixels. Larger distances between two reference-line points can be very suitable for visually verifying the geo-position of long linear features in an existing digital map database, such as lane dividers on a high way. By the given embodiment, instead of the screen displaying 1 km along the road it will display 8 km. To verify a road with a length of 80 km only 10 screens have to be verified instead of 80. Furthermore, the human interactions are reduced with a factor of 8, which improves the throughput time for verifying the linear road features of said 80 km road.

Figure 10:
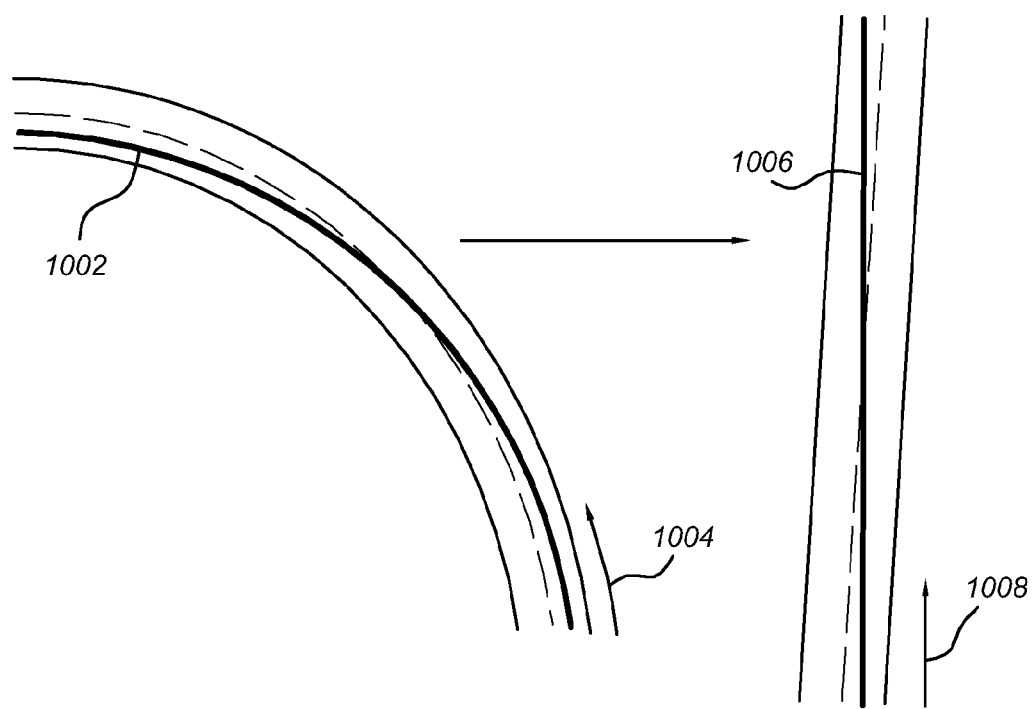

If the reference-line corresponds to the track-line of a moving vehicle along the road, the distance between two reference-line points depends on the maximum deviation of the heading direction of the vehicle with respect to the direction of the road and thus the linear features along the road. A deviation of the direction of the vehicle with respect to the direction of the true linear object will result in a slanted linear feature in a reference-line referenced image. FIG. 10 shows an example. For these applications it is assumed that the track-line and the linear road feature are not more then 5 degrees off. This allows us to sample along the reference-line, which defines the vertical resolution of a referenced-line referenced image, twelve times less frequent in orthorectified space than the target resolution of the line section perpendicular to the reference-line, which is the horizontal resolution. Optimal sampling along the reference-line should allow us to achieve the same expected digitization error along as well as across the reference-line. The error is proportional to res_hor/tan(alpha_diff) wherein alpha_diff is the local difference of direction of the reference-line and the direction of the linear feature, and res_hor is the horizontal resolution of the reference-line referenced image. Optimal sampling can be achieved via an assumption (maximal expected angle between direction of reference-line and direction of linear feature) or via image recognition (which determines the angle automatically), wherein the angle of a recognized linear feature in the reference-line referenced image with respect to a column of pixels defines the sampling to generate the subsequent reference-line referenced image along the reference-line. Image recognition detecting a change of lane could be used to improve further the optimal sampling. If the reference-line corresponds to the track line of a vehicle driving on a highway, the vehicle could follow the road direction or could change of lane. A change of lane will result in a curve in representation of the linear feature in the reference-line referenced image, which has to be digitized correctly in the image. To do this the distance between two points along the reference-line has to be small enough. If the track-line follows correctly the direction of the road, the linear feature will still be a straight feature in the reference-line reference image and the distance between two sample points needs not to be changed.

In another embodiment, the distance depends on the winding of the reference-line. If a reference-line is more or less straight, fewer points are needed to describe accurately the curvature then when the reference-line is curvy. This embodiment is useful to reduce the amount of data in a reference-line referenced data set. This could have advantages in the event the linear features are detected in the reference-line referenced data automatically by commonly known line detection algorithms.

Figure 8:
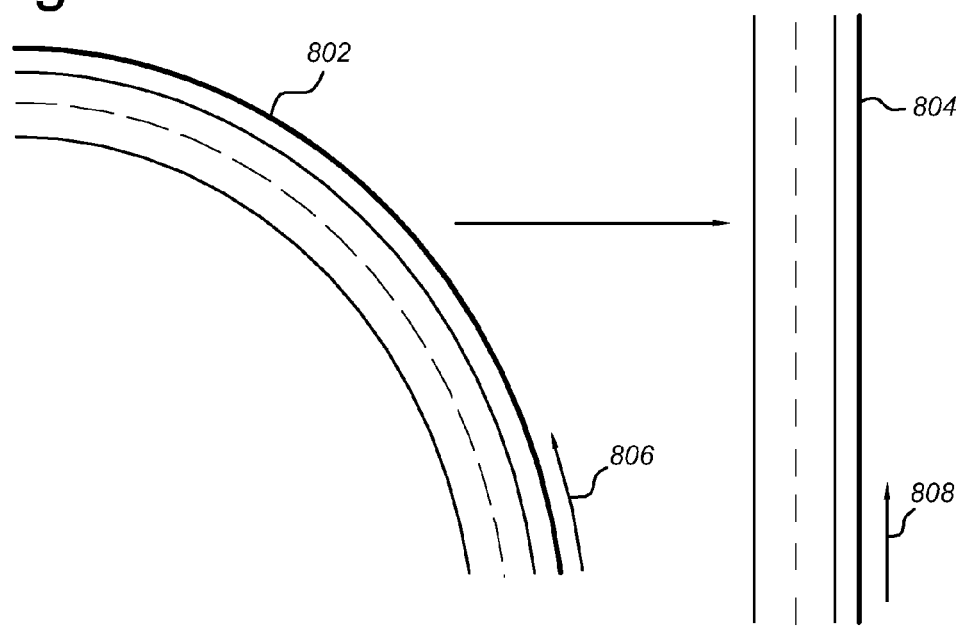
FIGS. 8-10 illustrate examples of the transformation from orthorectified image space to reference-line referenced image space with different reference-lines.
Figure 9:
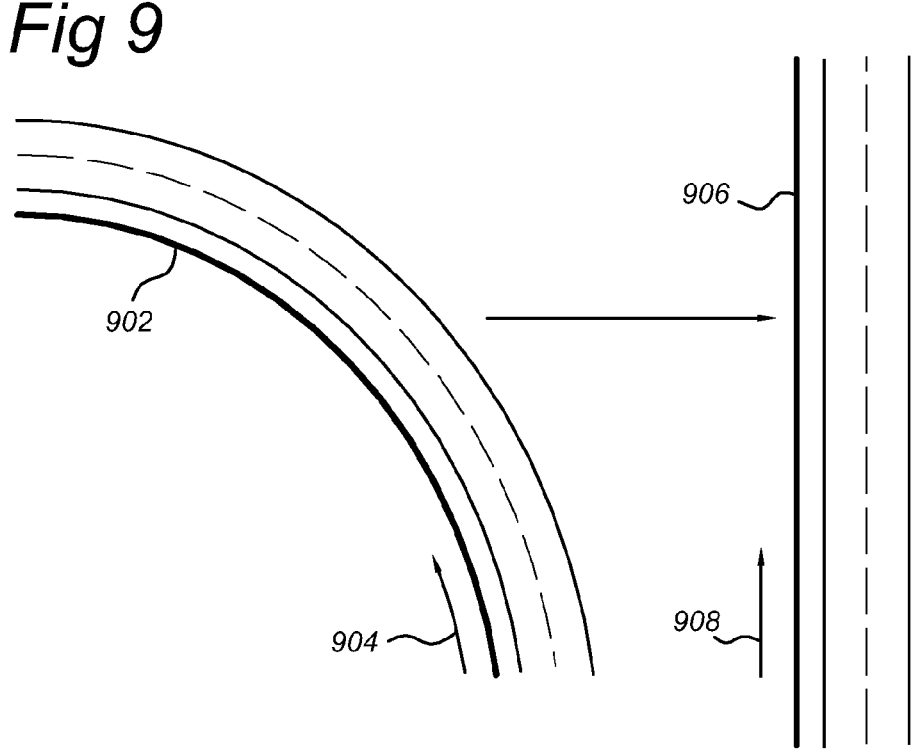

FIG. 8 shows an example of the reference-line referenced images transformation algorithm wherein the reference-line 802 is not across the road but parallel to the outside bend of the road. Arrow 806 indicates the direction of the reference-line 802 in the orthorectified image and arrow 808 indicates the direction of the reference-line 804 in the reference-line referenced image. Similarly, FIG. 9 shows an example of the reference-line referenced images transformation algorithm wherein the reference-line 902 is not across the road but parallel to the inside bend of the road. Arrow 904 indicates the direction of the reference-line 902 in the orthorectified image and arrow 908 indicates the direction of the reference-line 906 in the reference-line referenced image. FIG. 10 shows an example of the reference-line referenced images transformation algorithm wherein the orientation of the reference-line 1006 is angled with the orientation of the road. Arrow 1004 indicates the direction of the reference-line 1004 in the orthorectified image and arrow 1008 indicates the direction of the reference-line 1006 in the reference-line referenced image. It can be seen in the linear reference image at the right hand side, that the reference-line is vertical and the linear features, centerline 1010 and road side 1012 are slant vertical lines. To mark accurately the track of the centerline and road sides in orthorectified images shown in FIGS. 8-10, multiple marks have to be placed on the linear features. However to mark the track of the centerline and road sides in the reference-line referenced images shown in FIGS. 8-10, only the beginning and ending point of the centerline and two road sides in each image have to be marked. By knowing the geo-referenced position (in real world coordinates) of each pixel of the reference-line referenced image, the geo-position of the reference-line of the linear features can be determined accurately. Therefore, the use of reference-line referenced images with associated map projection enables us to speed-up the manual marking of linear road features to generate linear features for use in a map database.

In view of the above a reference-line referenced image has the following properties:
Total number of points used to indicate continuous linear elements of road (edges, lane dividers, etc.) is much fewer on reference-line referenced images, than the number of points that are necessary to indicate the same elements on source orthorectified image, with assumed equal relative and absolute accuracy of resulting curve. As each point (pixel) of the reference-line referenced image is unambiguously convertible to the projected coordinate referenced system of the orthorectified source image, it is possible to convert curves from reference-line referenced image to real world curves in the geographic coordinate reference system.
The total number of points needed to indicate a continuous linear object on a reference-line referenced image depends on the change of angle between the reference geometry and the object on the orthorectified source image. The more constant the angle, the fewer points should be marked to achieve the required accuracy of the object in the reference-line referenced image. The change of angle defines the straightness of the linear feature in the reference-line referenced image.

Figure 11:
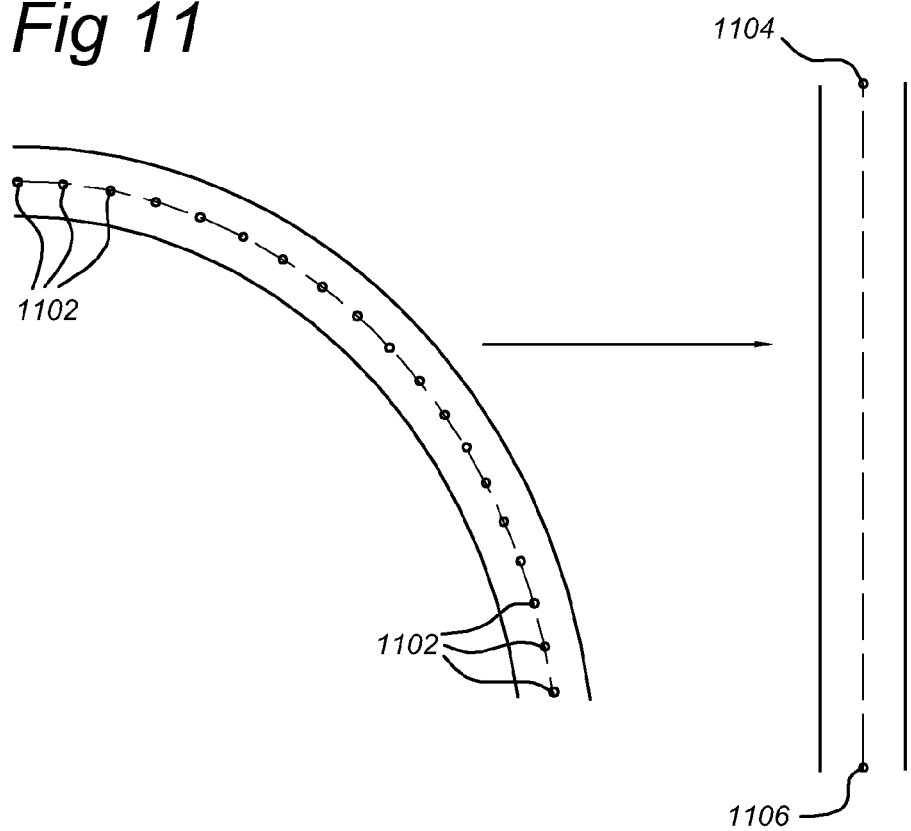
FIG. 11 illustrates the effectiveness of the invention.

FIG. 11 illustrates the advantage of the invention. At the left hand side, an orthorectified image of a curved road is shown. To mark the centerline of a road accurately, 14 marks have to be placed. At the right hand side, a reference-line referenced image is shown corresponding to the curved road in the left hand side image. To obtain the reference-line referenced image, the reference reference-line was parallel to the centerline of the road. In the reference-line referenced image only two marks are needed to mark accurately the centerline in the image. Thus, instead of 14 marks, now only two marks have to be placed, the beginning point 1106 and the ending point 1104 of the centerline in the image.

Figure 12:
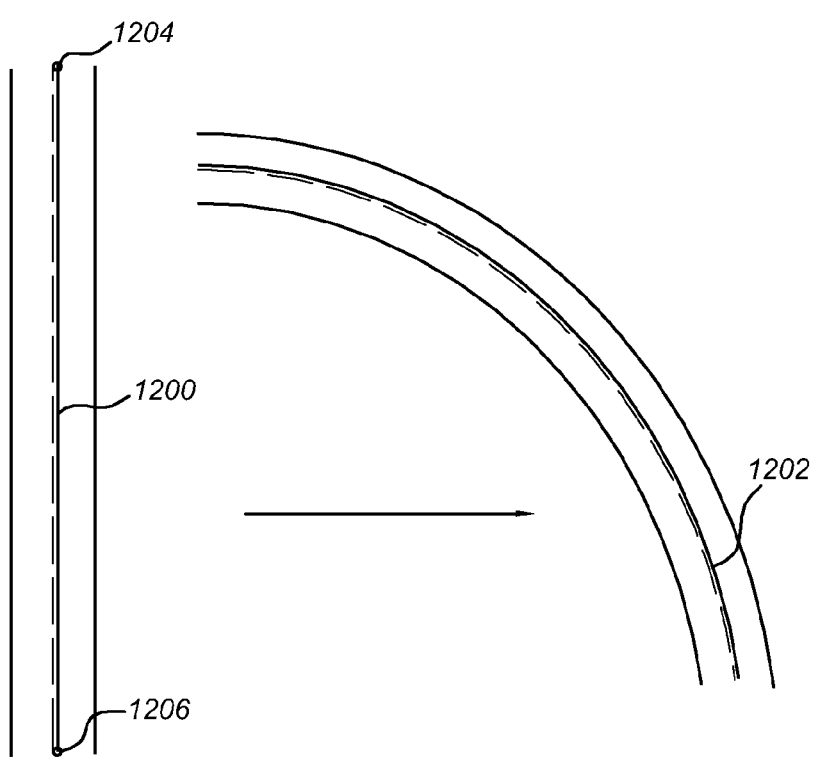
FIG. 12 illustrates the transformation from reference-line referenced space to orthorectified space; and, FIG. 13 illustrates the effect of decreasing the number image lines in reference-line referenced image space.

FIG. 12 illustrates the transformation from reference-line referenced image space back to orthorectified image space of the centerline marked in the reference-line referenced image shown in FIG. 11. Line 1200 corresponds to the position of the centerline in the reference-line referenced image. Each pixel of the reference-line referenced image can be unambiguously converted to a position in the orthorectified image. Therefore, the line between beginning point 1206 and ending point 1204 across the reference-line referenced image can be unambiguously converted to a curve on the orthorectified image. As each pixel in the orthorectified image has a geo-referenced position, the geo-referenced position of the curve can be accurately determined.

Figure 13:
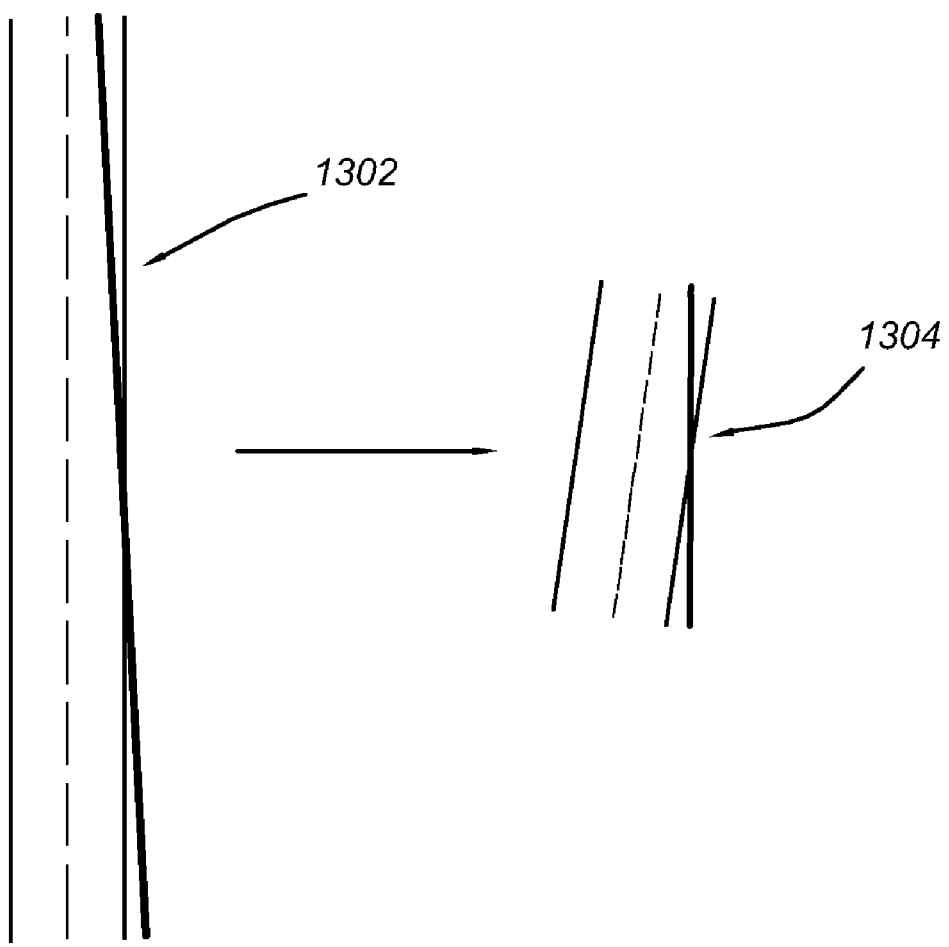

FIG. 13 shows a further advantage of a reference-line referenced image. In a reference-line referenced image, a curved reference-line on a orthorectified image will be a straight line. Furthermore, from FIG. 10 it is learned that even if the reference-line makes a constant angle with the linear feature in the orthorectified image, the linear feature will appear as a slanted straight line in the reference-line referenced image. This provides the possibility to change the vertical resolution of the reference-line referenced image without losing position information of the linear features. By decreasing the number of reference-line points along a reference-line in the reference-line referenced image, the vertical size of the image reduces. Consequently, a section along the reference-line will be smaller while the resolution perpendicular to the reference-line will be maintained in the reduced linear reference image. The left hand reference-line referenced image 1302 shows a road segment with a first resolution along the reference-line and the right hand reference-line referenced image 1304 shows the same road segment but with a resolution along the reference-line which is half of the first resolution. A change of resolution can be seen as a change in vertical scale of the reference-line referenced image. The allowable scale factor depends on how much deviation of angle between road objects and reference geometry changes, can be expected. The error introduced by such scaling will proportionally increase by the tangent angle between two linear features.

The embodiments and examples of the invention described above use geo-referenced orthorectified images as image data source and geo-referenced reference-line data. For each reference-line point, the position of a line section in the orthorectified image perpendicular to the direction of the reference-line in the reference-line point is determined. The position is used to derive a row of pixels for said line section from the corresponding pixels in the orthorectified image. However, it should be noted that the source images of the moving vehicle could also be used directly to derive values for the row of pixels. As said above, for each pixel the corresponding position in a geographic coordinate reference system is known. Unpublished patent application PCT/NL2006/050252 teaches how the x,y coordinates of pixels of the source image can be converted to the x,y position of a pixel of a orthorectified tile. Therefore, it is possible to convert directly the x,y coordinates of pixels in the source images obtained by a camera mounted on a moving vehicle corresponding to pixels of a row of pixels of a line section perpendicular to the direction of the reference-line at a reference-line point. Thus the invention can use an image data source wherein for each source image the characteristics of the camera, such as angle of view and focus length, and the position and orientation in a coordinate system is known. Therefore, the raw data captured by a mobile mapping vehicle is very suitable to produce a reference-line referenced image. The raw data comprises image sequences and position and orientation data of the mobile mapping vehicle in a geographic coordinate reference system. This information is enough to determine the x,y coordinates of pixels in a source image that correspond to a pixel in the reference-line referenced image. Furthermore, as the mobile mapping vehicle drives on the road, the recorded position information is suitable to be used as reference-line data.

The invention is very useful to producing linear road information. However, the invention can also be used to verify the linear road information in existing digital map databases. For each pixel in a reference-line referenced image its corresponding geo-coordinate is known. This makes is possible to overlay the linear road information in an existing digital map on the reference-line referenced image. By scrolling the linear reference image with overlaid linear road information along the reference-line, a human can very easily verify visually whether the linear road information in the existing map is correct and accurate enough. If not, the human just has to move the position of the overlaid linear road information on the reference-line referenced image and the updated positions of the road information can be stored for use in the digital map.

The present invention allows a human to analyze 20 times more information at one time then originally when looking at orthorectified images. The transformation to reference-line referenced images saves a multitude of screen scrolling needed to view next portions of a road segment by 7 times. Furthermore, the number of necessary points to digitize linear features is reduced by 20 times.

The method of the invention can be implemented on a computer arrangement as shown in FIG. 3.

The foregoing detailed description of the invention has been presented for purposes of illustration and description. It is not intended to be exhaustive or to limit the invention to the precise form disclosed, and obviously many modifications and variations are possible in light of the above teaching. The present invention can also be used without any mobile mapping system data. In an embodiment, the input images are aerial images with sufficient detail to detect linear road information, and the reference-line data corresponds to the centerline of a road from an existing database. From, those input data source a reference-line referenced image can be generated for use in the applications described above, e.g. producing linear road information or verifying the position of existing linear road information in an existing map database and to correct the information if necessary.

The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A method of capturing linear features along a reference-line across a surface for use in a map database, comprising:
   generating, from reference-line data representative of coordinates of said reference-line in a geographic coordinate reference system and source images of a surface adjacent to said reference-line and associated position and orientation data in said geographic coordinate reference system, a reference-line referenced data set, wherein the reference-line referenced data set comprises a plurality of sets of image data and associated data defining a reference-line across a surface in the geographic coordinate reference system, the sets of image data including pixels wherein a set of image data corresponds to an orthorectified view representation of a line section of the surface in the geographic coordinate reference system, each set of image data comprises a reference pixel associated with a position on the reference-line, wherein each pixel represents a surface including a position at a distance from the position of the reference pixel along the line section, and wherein the line section perpendicularly crosses the reference-line at the position associated with the reference pixel; and
   post processing the generated reference-line referenced data set to produce linear features along the reference-line and associated locations in the geographic coordinate reference system for use in a map database.

2. The method according to claim 1, wherein the source images include at least one of: images captured by a terrestrial camera mounted on a moving vehicle, aerial images, satellite images, and orthorectified images.

3. Method according to claim 1, wherein the reference-line includes at least one of: track line of a vehicle, road centerline from existing database, and other existing linear road geometry taken from an existing database.

4. The method of post processing a reference-line referenced data set to produce linear features along a reference line across a surface and associated locations in a geographic coordinate reference system for use in a map database, the method comprising;
   retrieving the reference-line referenced data set, wherein the reference-line referenced data set comprises a plurality of sets of image data and associated data defining a reference-line across a surface in the geographic; coordinate reference system, the sets of image data including pixels wherein a set of image data corresponds to an orthorectified view representation of a line section of the surface in the geographic coordinate reference system, each set of image data comprises a reference pixel being associated with a position on the reference-line, wherein each pixel represents a surface including a position at a distance from the position of the reference pixel along the line section, and wherein the line section perpendicularly crosses the reference-line at the position associated with the reference pixel;
   transforming the reference-line referenced data set into a reference-line referenced image, wherein each column of pixels of the transformed image corresponds to a surface parallel to the direction of said reference-line;
   selecting a linear feature in the reference-line referenced image:

determining coordinates in the geographic coordinate reference system of the linear feature from the position of the linear feature in the reference-line referenced image and associated data; and storing the coordinates of the linear feature in a database.

5. The method according to claim 4, wherein the linear feature includes at least one of: road centerline, road width, road curb, road painting, lane divider, number of lanes, traffic island, junctions and any other visual distinguishing feature of the surface along the reference-line.

6. The method according to claim 4, wherein the selecting comprises:

outputting the reference-line referenced image on a screen; and manually positioning a pointing device on the linear feature on the screen to obtain marked positions to define a position of the linear feature in the reference-line referenced image; and determining the coordinates in the geographic coordinate reference system of the linear feature from the position of the marked positions in the reference-line referenced image.

7. The method according to claim 4, wherein the selecting comprises:

performing a line detection algorithm on the reference-line referenced image to select the linear feature;

determining the pixel position of linear feature in the reference-line referenced image; and determining the coordinates in the geographic coordinate reference system of the linear feature from the pixel positions of the linear feature in the reference-line referenced image.

8. A computer implemented system for performing post processing of a reference-line referenced data set to produce linear features along a reference-line and associated locations in a coordinate system for use in a map database, the system comprising:

an input device;

a processor readable storage medium:

a processor in communication with said input device and said processor readable storage medium; and an output device to enable the connection with a display unit, said processor readable storage medium storing code to program said processor to perform actions comprising:

retrieving the reference-line referenced data set, wherein the reference-line referenced data set comprises, a plurality of sets of image data and associated data defining a reference-line across a surface in a geographic coordinate reference system, the sets of image data including pixels wherein a set of image data corresponds to an orthorectified view representation of a line section of the surface in the geographic coordinate reference system, each set of image data comprises a reference pixel being associated with a position on the reference-line, wherein each pixel represents a surface including a position at a distance from the position of the reference pixel-along the line section, and wherein the line section perpendicularly crosses the reference-line at the position associated with the reference pixel;

transforming the reference-line referenced data set into a reference-line referenced image, wherein each column of pixels of the reference-line referenced image corresponds to a surface parallel to the reference-line;

selecting a linear feature in the reference-line referenced image;

determining coordinates in the geographic coordinate reference system of the linear feature from the pixel position of the linear feature in the reference-line referenced image and associated data; and storing the coordinates of the linear feature in a database.

9. A computer implemented system for verifying linear features along a reference-line and associated locations in a coordinate system, the system comprising:

an input device:

a processor readable storage medium;

a processor in communication with said input device and said processor readable storage medium; and an output device to enable the connection with a display unit, said processor readable storage medium storing code to program said processor to perform actions comprising:

retrieving from a map database reference-line data representative of coordinates of a reference-line across a surface in a geographic coordinate reference system;

retrieving an orthorectified image of said surface and associated position and orientation data in said geographic, coordinate reference system generating from the reference-line data and orthorectified images a reference-line referenced image, wherein each row of pixels of the referenced-line referenced image corresponds to a section of said surface perpendicular to the direction of the reference-line and each column of pixels of the reference-line referenced image corresponds to a surface parallel to the reference-line;

verifying the position of linear features in the reference-line referenced image;

marking positions showing defects with respect to at least one of position of linear feature, straightness of linear feature, and parallelism of linear features;

determining coordinates in the geographic, coordinate reference system of the marked positions in the reference-fine referenced image showing defects; and storing the coordinates of the marked defects in a database for further processing.

10. A non-transitory processor readable medium carrying a computer program product, which when executed on a computer arrangement, allow said computer arrangement to perform the methods according to claim 1.

* * * * *